(12) United States Patent
Henry et al.

(10) Patent No.: US 7,315,921 B2
(45) Date of Patent: *Jan. 1, 2008

(54) APPARATUS AND METHOD FOR SELECTIVE MEMORY ATTRIBUTE CONTROL

(75) Inventors: G. Glenn Henry, Austin, TX (US); Rodney E. Hooker, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 817 days.

This patent is subject to a terminal disclaimer.

(21) Appl. No.: 10/227,572

(22) Filed: Aug. 22, 2002

(65) Prior Publication Data

US 2003/0159009 A1 Aug. 21, 2003

Related U.S. Application Data

(60) Provisional application No. 60/358,242, filed on Feb. 19, 2002.

(51) Int. Cl.
*G06F 9/312* (2006.01)
*G06F 12/02* (2006.01)

(52) U.S. Cl. ...................................................... 711/154
(58) Field of Classification Search ................. 711/154, 711/170; 712/209, 210
See application file for complete search history.

(56) References Cited

U.S. PATENT DOCUMENTS

| | | |
|---|---|---|
| 3,657,705 A | 4/1972 | Mekota et al. |
| 4,064,554 A | 12/1977 | Tubbs |
| 4,217,638 A | 8/1980 | Namimoto et al. |
| 4,547,849 A | 10/1985 | Louie et al. |
| 5,029,069 A | 7/1991 | Sakamura |
| 5,142,679 A | 8/1992 | Owaki et al. |
| 5,218,712 A | 6/1993 | Cutler et al. |
| 5,448,744 A | 9/1995 | Eifert et al. |

(Continued)

FOREIGN PATENT DOCUMENTS

| | | |
|---|---|---|
| CN | 1431584 | 7/2003 |
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Haitham Akkary; Memory System for Ordering Load and Store Instructions in a Processor that Performs Out-of-Order Multithread Execution; US2002/0194457; Dec. 9, 2002.

(Continued)

*Primary Examiner*—Kevin L. Ellis
(74) *Attorney, Agent, or Firm*—Richard K. Huffman; James W. Huffman (57) ABSTRACT

An apparatus and method are provided for extending a microprocessor instruction set to allow for selective override of memory traits at the instruction level. The apparatus includes translation logic and extended execution logic. The translation logic translates an extended instruction into a micro instruction sequence. The extended instruction has an extended prefix and an extended prefix tag. The extended prefix specifies a memory trait for a memory reference prescribed by the extended instruction, where the memory trait for the memory reference cannot be specified by an existing instruction from an existing instruction set. The extended prefix tag indicates the extended prefix, where the extended prefix tag is an otherwise architecturally specified opcode within the existing instruction set. The extended execution logic is coupled to the translation logic. The extended execution logic receives the micro instruction sequence, and employs the memory trait to execute the memory reference.

37 Claims, 7 Drawing Sheets

U.S. PATENT DOCUMENTS

| | | | |
|---|---|---|---|
| 5,471,595 | A | 11/1995 | Yagi et al. |
| 5,481,684 | A | 1/1996 | Richter et al. |
| 5,687,338 | A | 11/1997 | Boggs et al. |
| 5,751,996 | A | 5/1998 | Glew et al. |
| 5,757,103 | A | 5/1998 | Lee et al. |
| 5,768,574 | A | 6/1998 | Dutton et al. |
| 5,778,220 | A | 7/1998 | Konigsfeld et al. |
| 5,796,973 | A | 8/1998 | Witt et al. |
| 5,822,778 | A | 10/1998 | Dutton et al. |
| 5,826,089 | A | 10/1998 | Ireton |
| 5,857,103 | A | 1/1999 | Grove |
| 5,875,342 | A | 2/1999 | Temple |
| 5,913,049 | A | 6/1999 | Shiell et al. |
| 5,937,199 | A | 8/1999 | Temple |
| 5,991,872 | A | 11/1999 | Shiraishi et al. |
| 6,014,735 | A | 1/2000 | Chennupaty et al. |
| 6,029,222 | A | 2/2000 | Kamiya |
| 6,058,472 | A | 5/2000 | Panwar et al. |
| 6,085,312 | A | 7/2000 | Abdallah et al. |
| 6,157,996 | A | 12/2000 | Christie et al. |
| 6,199,155 | B1 | 3/2001 | Kishida et al. |
| 6,230,259 | B1 | 5/2001 | Christie et al. |
| 6,317,822 | B1 | 11/2001 | Padwekar |
| 6,351,806 | B1 * | 2/2002 | Wyland ................ 712/225 |
| 6,434,693 | B1 | 8/2002 | Senter et al. |
| 6,456,891 | B1 | 9/2002 | Kranich et al. |
| 6,549,999 | B2 * | 4/2003 | Kishida et al. ............ 712/210 |
| 6,560,694 | B1 | 5/2003 | McGrath et al. |
| 6,581,154 | B1 | 6/2003 | Zaidi |
| 6,647,488 | B1 * | 11/2003 | Takeno et al. ............ 712/212 |
| 6,823,414 | B2 | 11/2004 | Radhakrishna |
| 6,883,053 | B2 | 4/2005 | Shinagawa et al. |
| 2001/0013870 | A1 | 8/2001 | Pentkovski et al. |
| 2003/0159020 | A1 | 8/2003 | Henry et al. |
| 2003/0172252 | A1 | 9/2003 | Henry et al. |
| 2003/0188130 | A1 | 10/2003 | Henry et al. |
| 2005/0102492 | A1 | 5/2005 | Henry et al. |
| 2005/0188179 | A1 | 8/2005 | Henry et al. |

OTHER PUBLICATIONS

Silberman et al. *An Architectural Framework for Supporting Heterogeneous Instruction–Set Architectures*. Computer, IEEE Computer Society, Long Beach, Ca. US vol. 26, No. 6 Jun. 1, 1993. pp. 39–56. ISSN: 0018-0162.

Intel Architecture Software Developer's Manual, vol. 2: Instruction Set Reference. 1999. pp. 2–1 to 2–4, 3–332, 3–353 and B25.

Papa et al. "Power PC ™: A Performance Architecture," COMPCON Spring '93, Digest of Papers, San Francisco, CA, IEEE Computer Society, Feb. 22, 1993, pp. 104–108.

Patterson & Hennessy. "Computer Organization and Design: The Hardware/Software Interface." 1998. Morgan Kaufmann Publishers, Inc. Second Edition. pp. 177–178, 297.

Dobb. "Microprocessor Resources. " 2000 http://web.archive.org/web/20000118231610 http://x86.org/secrets/op-codes/icebp.htm.

Patterson & Hennessy, "Computer Organization and Design: The Hardware/Software Interface," 1998. Morgan Kaufman Publishers, Inc. Second Edition. pp. 177–178, 297.

Dobb, "Microprocessor Resources," 2000. http://web.archive.org/web/20000118231610 http://x86.org/secrets/op-codes/Icebp.htm.

\* cited by examiner

Fig. 1 (Related Art)

*Microprocessor Instruction Format*

Fig. 2 (Related Art)

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

Fig. 5

*Microprocessor For Selective Memory Attributes Control*

Fig. 6

*Extended Prefix for Prescribing Extended Memory Traits*   ⟋—600

Fig. 7

*Extended Prefix for Prescribing Extended Memory Traits*   ⟋—700

Fig. 8

*Extended Prefix Details - Memory Attribute Override*   ⟋—800

| ATTR | TRAIT |
|---|---|
| 000 | UNCACHEABLE |
| 001 | WRITE COMBINING |
| 010 | WRITE THROUGH |
| 011 | WRITE BACK |
| 100 | WRITE PROTECTED |
| 101 | SPARE |
| 110 | SPARE |
| 111 | SPARE |

*Execute Stage Details*

*Fig. 11*

*Method for Overriding Memory Traits In A Microprocessor*

APPARATUS AND METHOD FOR SELECTIVE MEMORY ATTRIBUTE CONTROL

CROSS-REFERENCE TO RELATED APPLICATIONS

This application claims the benefit of U.S. Provisional Application No. 60/358,242 filed on Feb. 19, 2002.

This application is related to the following co-pending U.S. Patent Applications, all of which have a common assignee and common inventors.

| SERIAL NUMBER | FILING DATE | DOCKET NUMBER | TITLE |
|---|---|---|---|
| 10/144,595 | May 9, 2002 | CNTR.2176 | APPARATUS AND METHOD FOR EXTENDING A MICROPROCESSOR INSTRUCTION SET |
| 10/144,592 | May 9, 2002 | CNTR.2186 | APPARATUS AND METHOD FOR CONDITIONAL INSTRUCTION EXECUTION |
| 10/144,593 | May 9, 2002 | CNTR.2188 | APPARATUS AND METHOD FOR SELECTIVE CONTROL OF CONDITION CODE WRITE BACK |
| 10/144,590 | May 9, 2002 | CNTR.2189 | MECHANISM FOR EXTENDING THE NUMBER OF REGISTERS IN A MICROPROCESSOR |
| 10/227,008 | Aug. 22, 2002 | CNTR.2190 | APPARATUS AND METHOD FOR EXTENDING DATA MODES IN A MICROPROCESSOR |
| 10/227,571 | Aug. 22, 2002 | CNTR.2191 | APPARATUS AND METHOD FOR EXTENDING ADDRESS MODES IN A MICROPROCESSOR |
| 10/283,397 | Oct. 29, 2002 | CNTR.2192 | SUPPRESSION OF STORE CHECKING |
| 10/384,390 | Mar. 10, 2003 | CNTR.2193 | SELECTIVE INTERRUPT SUPPRESSION |
| 10/227,583 | Aug. 22, 2002 | CNTR.2195 | NON-TEMPORAL MEMORY REFERENCE CONTROL MECHANISM |
| 10/144,589 | May 9, 2002 | CNTR.2198 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating selective memory attribute control into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multi-media operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—furthermore accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet while in the past developers have been able to incorporate newly developed architectural features into existing instruction set architectures, the means whereby use of these features is enabled—programmable instructions—are becoming scarce. More specifically, there are no more "spare" instructions in certain instruction sets of interest that provide designers with a way to incorporate newer features into an existing architecture.

In the x86 instruction set architecture, for example, there are no remaining undefined 1-byte opcode states. All 256 opcode states in the primary 1-byte x86 opcode map are taken up with existing instructions. As a result, x86 microprocessor designers must presently make a choice to either provide new features or to retain legacy compatibility. If new programmable features are to be provided, then they must be assigned to opcode states in order for programmers to exercise those features. And if spare opcode states do not remain in an existing instruction set architecture, then some of the existing opcode states must be redefined to provide for specification of the new features. Thus, legacy compatibility is sacrificed in order to make way for new feature growth.

One particular problem area that concerns microprocessor designers today relates to the efficient employment of cache structures by application programs. As cache technologies have evolved, more and more features have been provided that allow system programmers to control when and how memory caches are employed in a system. Early cache control features only provided an on/off capability. By setting bits in an internal register of a microprocessor, or by asserting certain external signal pins on its package, designers could enable caching of memory or they could render an entire memory space as uncacheable. Uncacheable memory references (i.e., loads/reads and stores/writes) are always provided to a system memory bus and thus incur the latencies commensurate with external bus architectures. Conversely, memory references, or accesses, to a cache are provided to the system memory bus only when a cache miss occurs (i.e., when the object of a memory reference is not valid within internal cache). Cache features have enabled application programs to experience dramatic improvements in execution speed, particularly those making repeated references to the same data structure in memory.

More recent microprocessor architecture improvements have allowed system designers to more precisely control how cache features are employed. These improvements permit the designers to define the properties of a range of addresses within a microprocessor's address space in terms of how references to those addresses are executed by the microprocessor with regard to its cache hierarchy. Generally speaking, references to those addresses can be defined as uncacheable, write combining, write through, write back, or write protected. These properties are known as memory attributes, or memory traits. Hence, store references to an address having a write back attribute are provided to cache and are speculatively allocated. Store references to a different address having an uncacheable trait are provided to the system bus and are not speculatively allocated.

It is not within the scope of the present application to provide an in-depth description of memory attributes and how specific attributes are processed by a microprocessor with regard to its cache. It is sufficient herein to understand that the state of the art enables designers to assign a memory attribute to a region of memory and that all subsequent memory references to addresses within that region will be handled according to the cache policy associated with the prescribed memory attribute.

Although present day microprocessor designs allow different regions of memory to be assigned different memory traits, the designs are limited in two significant respects. First, microprocessor instruction set architectures restrict execution of instructions for defining/changing memory traits to a privilege level that is inaccessible by user-level applications. Accordingly, when a desktop/laptop microprocessor boots up, its operating system establishes the memory traits for physical memory space prior to invocation of any user-level application program. The user-level applications are thus precluded from changing the memory traits of the host system. Secondly, the level of granularity provided by a present day microprocessor for establishing memory traits is page level at best. In conventional architectures that allow memory paging, the memory attributes of each memory page are further refined by the operating system within page directory/table entries. Hence, all references to addresses within a particular page will employ the memory attribute assigned to the particular page during execution of the associated memory access operation.

For many applications, the above control features have caused user-level programs to experience marked improvements in execution speed, but the present inventors have noted that other applications are limited because present day memory trait controls are not available for employment at the user level, and furthermore because memory attributes can only be established with page-level granularity. For example, a user program that makes repeated accesses to a first data structure will suffer when an incidental reference to a second data structure occurs, under the conditions where the cache entries of the first data structure must be flushed to provide space within the cache for the second data structure. Because operating systems have no a priori knowledge of the frequency of references to data structures by user-level application programs, application data spaces are typically assigned a write back trait, thus setting up the conditions for the above noted conflict. And an application programmer has no means to alter the assigned trait to force the incidental reference to go to the memory bus (e.g., assign an uncacheable trait to the second data structure), thereby precluding the conflict.

Therefore, what is needed is an apparatus and method that incorporate selective memory attribute control features into an existing microprocessor architecture having a completely full opcode set, where incorporation of the attribute control features allows a conforming microprocessor to retain the capability to execute legacy application programs while concurrently providing application programmers with the capability to modify memory attributes.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for instruction-level memory trait control features. In one embodiment an apparatus provides for instruction level control of memory attributes within a microprocessor. The apparatus includes translation logic and extended execution logic. The translation logic translates an extended instruction into a micro instruction sequence. The extended instruction has an extended prefix and an extended prefix tag. The extended prefix specifies a memory trait for a memory reference prescribed by the extended instruction, where the memory trait for the memory reference cannot be specified by an existing instruction from an existing instruction set. The extended prefix tag indicates the extended prefix, where the extended prefix tag is an otherwise architecturally specified opcode within the existing instruction set. The extended execution logic is coupled to the translation logic. The extended execution logic receives the micro instruction sequence, and employs the memory trait to execute the memory reference.

One aspect of the present invention contemplates a microprocessor mechanism, for extending an existing instruction set to provide for selective control of memory traits. The microprocessor mechanism has an extended instruction and a translator. The extended instruction prescribes a memory attribute for a memory access, where the extended instruction comprises a selected opcode in the existing instruction set followed by an n-bit extended prefix. The selected opcode indicates the extended instruction and the n-bit extended prefix indicates the memory attribute. The memory attribute for the memory access cannot otherwise be prescribed by instructions according to the existing instruction set. The translator receives the extended instruction, and generates a micro instruction sequence directing a microprocessor to execute the memory access, where the memory access is to be executed according to the memory attribute.

Another aspect of the present invention comprehends an apparatus, for adding instruction level memory trait control features to an existing instruction set. The apparatus includes an escape tag, a memory trait specifier, and extended execution logic. The escape tag is received by translation logic, and indicates that accompanying parts of a corresponding instruction prescribe a memory access, where the escape tag is a first opcode within the existing instruction set. The memory trait specifier is coupled to the escape tag and is one of the accompanying parts. The memory trait specifier prescribes one of a plurality of memory traits for the memory access. The extended execution logic is coupled to the translation logic. The extended execution logic executes the memory access using the one of the plurality of memory traits, where the existing instruction set provides only for specification of a default memory trait for the memory access, and where the execution logic employs the one of a plurality of memory traits to override the default memory trait.

A further aspect of the present invention provides a method for extending an existing instruction set architecture to enable selective memory attribute control at the instruction level. The method includes providing an extended instruction, the extended instruction including an extended tag along with an extended prefix, where the extended tag is a first opcode entity according to the existing instruction set architecture; prescribing, via the extended prefix, a memory attribute to be employed for a corresponding memory access, where the memory access is specified by remaining parts of the extended instruction; and employing the memory attribute to execute the memory access, wherein the employing supersedes a default memory attribute for the memory access.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
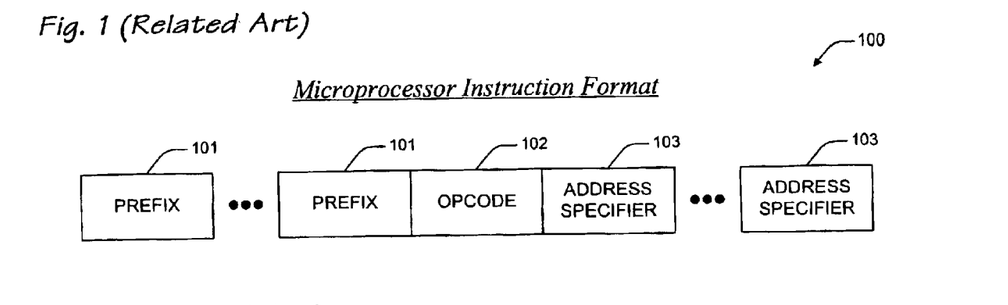
FIG. 1 is a block diagram illustrating a related art microprocessor instruction format.
Figure 2:
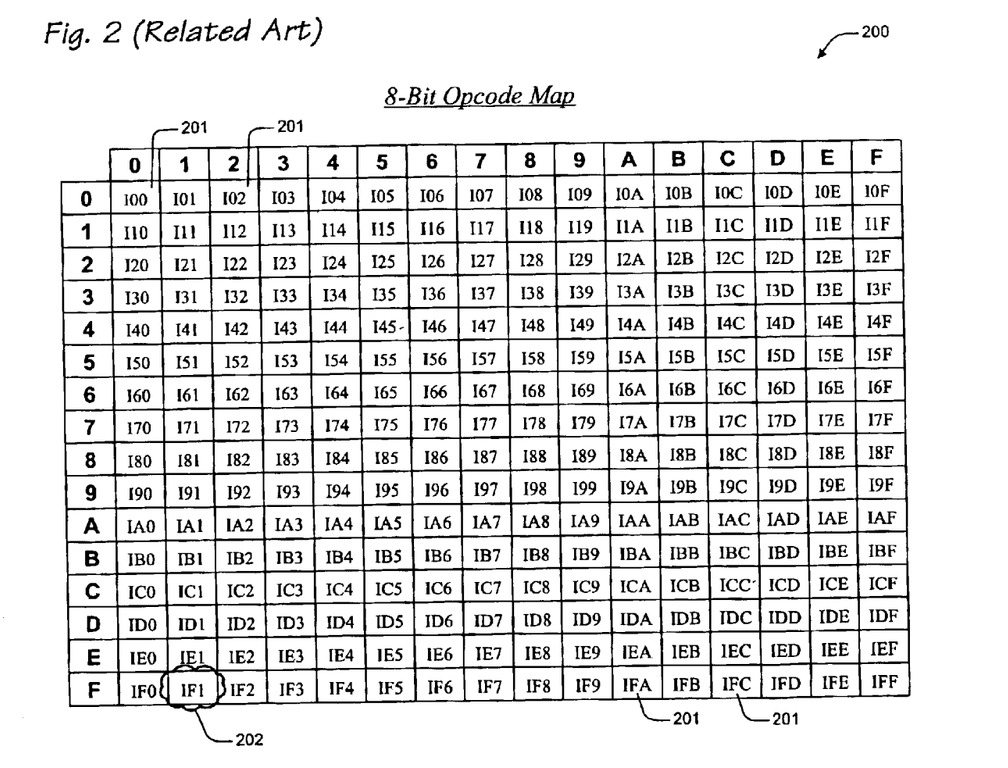
FIG. 2 is a table depicting how instructions in a instruction set architecture are mapped to logic states of bits in an 8-bit opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1–2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1–2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3–11. By employing an existing, yet obsolete, opcode as a prefix tag for an extended instruction that follows, the present invention enables microprocessor designers to overcome the limitations of completely full instruction set architectures, thereby allowing them to provide programmers with the capability to assign memory traits at the instruction level for a specific memory reference while concurrently retaining all the features that are required to run legacy application programs.

Turning to FIG. 1, a block diagram is presented illustrating a related art microprocessor instruction format 100. The related art instruction 100 has a variable number of instruction entities 101–103, each set to a specified value, that together make up a specific instruction 100 for a microprocessor. The specific instruction 100 directs the microprocessor to perform a specific operation such as adding two operands together, or moving an operand from/to memory to/from an internal register. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different virtual address sizes (e.g., 8-bit, 16-bit, 32-bit). Accordingly, these processors are programmed to a default address size (say, 32-bit), and prefixes 101 are provided in their respective instruction sets enabling programmers to selectively override the default operand size (say, to generate 16-bit virtual addresses) on an instruction-by-instruction basis. Selectable address size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to values of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). Features such as described in this x86 example are enabled in part in a present day microprocessor because instruction translation/decoding logic in the microprocessor interprets the entities 101–103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have run into a brick wall in terms of providing enhancements for a very straightforward reason: all of the available/spare opcode states have been used up, that is, all of the opcode values in the opcode map 200 have been architecturally specified. When all of the available opcode values have been assigned as either opcode entities 102 or prefix entities 101, then there are no more values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One alternative that stops short of entirely obliterating an existing instruction set and replacing it with a new format 100 and opcode map 200 is to substitute new instruction meanings for only a small subset of existing opcodes 201 that are presently used by application programs, say opcodes 40H through 4FH in FIG. 2. Under this hybrid technique, a conforming microprocessor operates exclusively in one of two operating modes: a legacy-compatible mode, where opcodes 40H–4FH are interpreted according to legacy rules, or an enhanced mode, where opcodes 40H–4FH are interpreted according to enhanced architectural rules. This technique indeed enables designers to incorporate new features into a design, but when the conforming microprocessor is running in an enhanced mode it excludes execution of any application program that uses opcodes 40H–4FH. Hence, from the standpoint of retaining legacy compatibility, the legacy-compatible/enhanced mode technique is not optimum.

The present inventors, however, have noted the frequency of use of certain opcodes 201 in instruction sets 200 having fully-populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit extended memory trait specifier prefix whereby programmers are enabled to prescribe a memory attribute for a corresponding memory access operation on an instruction-by-instruction basis in a microprocessor. During execution of the corresponding memory access operation, the memory attribute is to be employed in place of a default attribute that is prescribed in memory trait descriptor tables/mechanisms previously established by operating system applications. The present invention will now be discussed with reference to FIGS. 3–11.

Figure 3:
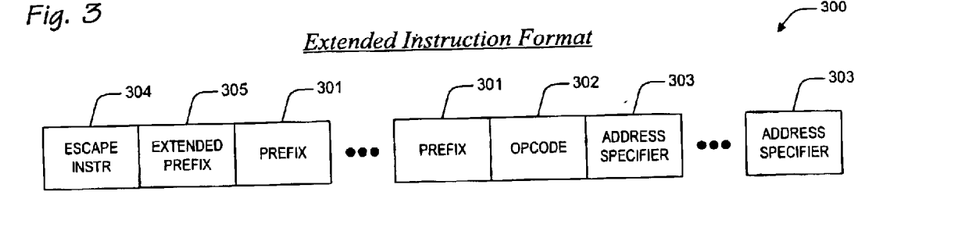
FIG. 3 is a block diagram featuring an extended instruction format according to the present invention.

Turning to FIG. 3, a block diagram is presented featuring an extended instruction format 300 according to the present invention. Very much like the format 100 discussed with reference to FIG. 1, the extended instruction format 300 has a variable number of instruction entities 301–305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, registers where the operands are located, direct and indirect data to be used in computation of memory addresses for source/result operands, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301–303 in a formatted extended instruction 300. The purpose of the two additional entities 304, 305 is to provide the capabilities for programmers to specify a memory trait for a memory reference prescribed by the extended instruction 300, where the memory trait corresponding to the memory reference is not otherwise specified by an existing instruction set for the conforming microprocessor. The optional entities 304, 305 are an extended instruction tag 304 and an extended memory trait specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended prefix 305 prescribes a memory attribute that corresponds to a specified memory access. In one embodiment, the escape tag 304 indicates that accompanying parts 301–303, 305 of a corresponding instruction 300 prescribe a memory access to be performed by the microprocessor. The memory trait specifier 305, or extended prefix 305, prescribes one of a plurality of memory traits for the memory access. Extended execution logic in the microprocessor executes the memory access according to the specified memory trait, thus overriding a default memory attribute for the memory access that has been prescribed by other means through the use of control register bits, memory type registers, page tables, and other types of memory attribute descriptors employed within a present day microprocessor architecture.

To summarize the selective memory attribute control technique according to the present invention, an extended instruction is configured to prescribe a memory attribute for a memory access in an existing microprocessor instruction set, where the memory attribute for the memory access cannot otherwise be prescribed by instructions according to the existing microprocessor instruction set. The extended instruction includes one of the opcodes/instructions 304 in the existing instruction set and an n-bit extended prefix 305. The selected opcode/instruction serves as an indicator 304 that the instruction 300 is an extended features instruction 300 (that is, it prescribes extensions to the microprocessor architecture), and the n-bit features prefix 305 indicates the memory attribute. In one embodiment, the extended prefix 305 is 8-bits in size, providing for the specification of up to 256 different attributes or a combination of memory attributes and other extended features. An n-bit prefix embodiment provides for the specification of up to $2^n$ different memory traits.

Figure 4:
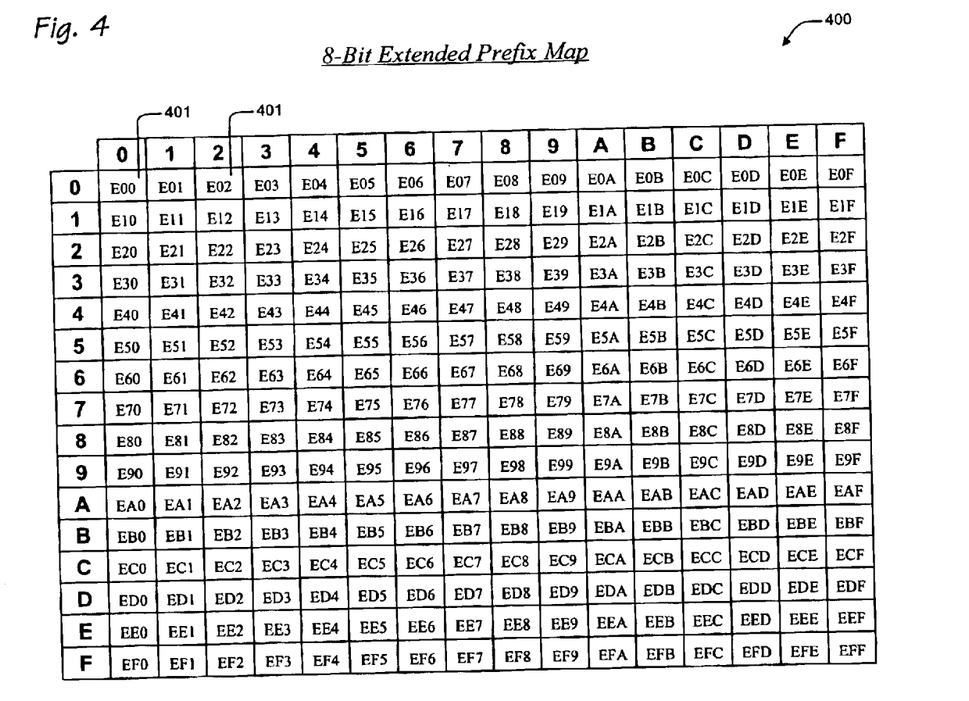
FIG. 4 is a table showing how extended architectural features are mapped to logic states of bits in an 8-bit extended prefix embodiment according to the present invention.

Now turning to FIG. 4, a table 400 is presented showing how memory attributes for a prescribed memory reference are mapped to logic states of bits in an 8-bit extended prefix embodiment according to the present invention. Similar to the opcode map 200 discussed with reference to FIG. 2, the table 400 of FIG. 4 presents an exemplary 8-bit extended prefix map 400 that associates up to 256 values of an 8-bit extended prefix entity 305 with corresponding memory traits 401 (e.g., E34, E4D, etc.) of a conforming microprocessor. In the case of an x86 embodiment, the 8-bit extended feature prefix 305 according to the present invention serves to provide for instruction-level control of memory traits 401 (i.e., E00-EFF) which cannot be specified at that level by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

Figure 5:
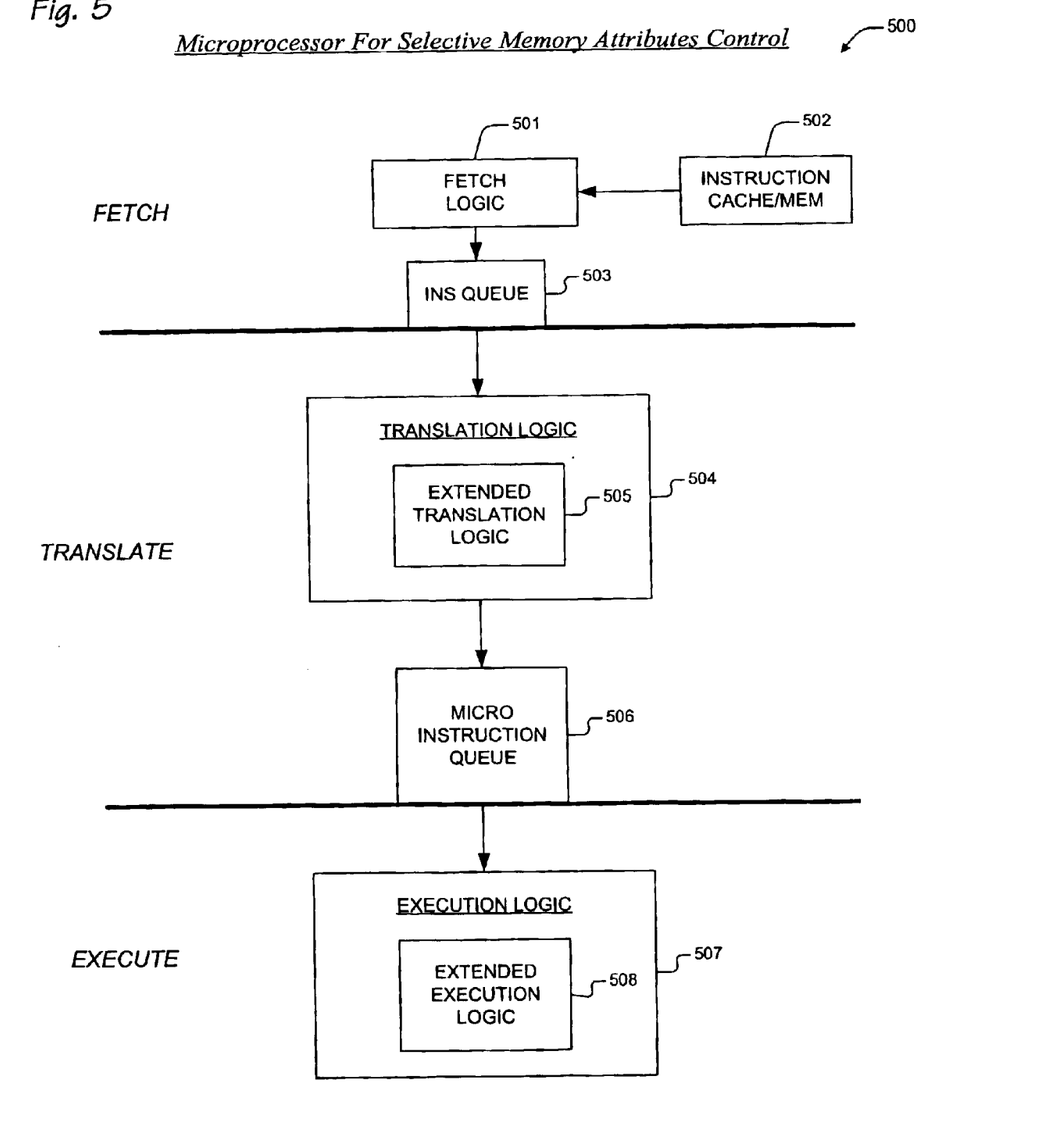
FIG. 5 is a block diagram illustrating a pipeline microprocessor for employing selective memory attributes control according to the present invention.

Now referring to FIG. 5, a block diagram is presented illustrating a pipeline microprocessor 500 for performing selective memory attribute control operations according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506.

The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that directs the microprocessor 500 to perform the operations prescribed by the instructions. The extended translation logic 505 detects those instructions having an extended prefix tag according to the present invention and also provides for translation/decoding of corresponding extended memory trait specifier prefixes. In an x86 embodiment, the extended translation logic 505 is configured to detect an extended prefix tag of value F1H, which is the x86 ICE BKPT opcode. Extended micro instruction fields along with are provided in the micro instruction queue 506 to allow for the prescription of memory traits for associated memory references prescribed by accompanying parts of the instruction.

The micro instructions are provided from the micro instruction queue 506 to the execution logic 507, wherein the extended execution logic 508 is configured to execute a specified memory reference according to a default memory trait (defined by existing memory trait descriptor means) or to override the default memory trait as specified in the extended micro instruction fields by employing a memory trait that was programmed at the user level via an extended prefix according to the present invention. In one embodiment, the memory trait is applied with cache line granularity.

One skilled in the art will appreciate that the microprocessor 500 described with reference to FIG. 5 is a simplified representation of a present day pipeline microprocessor 500. In fact, a present day pipeline microprocessor 500 comprises upwards to 20–30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Figure 6:
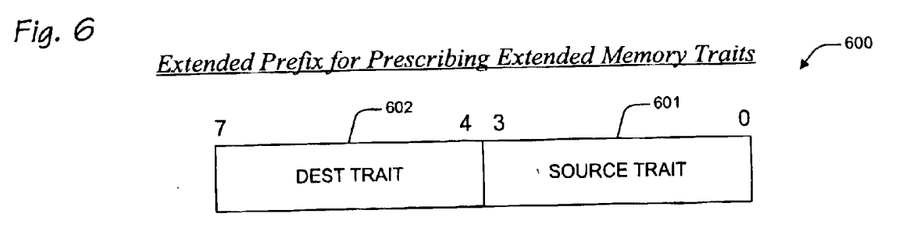
FIG. 6 is a block diagram featuring one embodiment of an extended prefix for prescribing extended memory traits in a microprocessor according to the present invention.

Turning now to FIG. 6, a block diagram is presented featuring one embodiment of an extended prefix 600 for prescribing a memory attribute for a programmed memory access in a microprocessor according to the present invention. The memory trait specifier prefix 600 is 8-bits in size and includes a source trait field 601 and a destination trait field 602. The source trait field 601 prescribes a memory attribute for source operand memory accesses (i.e., loads, reads) prescribed by remaining parts of an associated extended instruction and the destination trait field 602 prescribes a memory attribute for destination operand memory accesses (i.e., stores, writes) prescribed by the remaining parts. The exemplary 8-bit prefix 600 thus allows for specification of one of 16 different memory traits for both source and destination operands that override default traits prescribed for their, associated address ranges or memory pages. The embodiment featured in FIG. 6 prescribes a single source memory trait for all source operand addresses associated with the corresponding instruction and a single (but perhaps different) destination operand trait for all destination operands. One skilled in the art will appreciate that separately specifiable source and destination attributes are particularly useful when employed in conjunction with repeated string instructions such as those in the x86 architecture (i.e., REP MOVS, etc.). A variation of the above embodiment provides a corresponding destination trait field 602 and source trait field 601 for each destination/source operand referenced by the corresponding instruction, thus commensurately increasing/decreasing the number of bits for the prefix 600.

Figure 7:
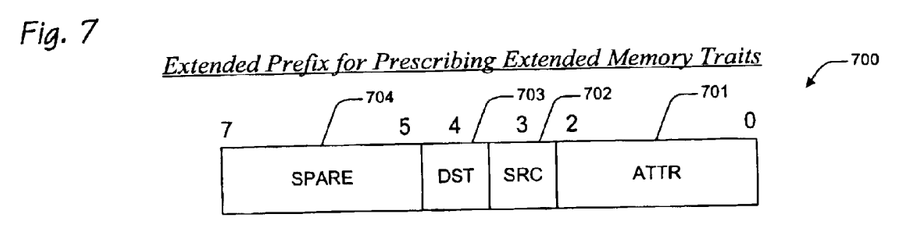
FIG. 7 is a block diagram featuring another embodiment of an extended prefix for prescribing extended memory traits in a microprocessor according to the present invention.

Referring now to FIG. 7, a block diagram is presented featuring an alternative embodiment of an extended prefix 700 for prescribing a memory attribute for a programmed memory access in a microprocessor according to the present invention. The memory attribute prefix 700 is 8-bits in size and includes an attribute field 701, a source bit 702, a destination bit 703, and a spare field 704. The 3-bit attribute field 701 prescribes one of 8 different memory traits for performance of the memory access specified by a corresponding instruction. The source bit 702 enables application of the attribute prescribed by the attribute field 701 for all source operand memory accesses and the destination bit 703 enables application of the attribute for all destination operand memory accesses. The alternative 8-bit prefix 700 thus allows for specification of one of 8 different memory traits for that may be applied to either source references, destination references, or both source and destination references that override default traits prescribed for their associated address ranges or memory pages.

Figure 8:
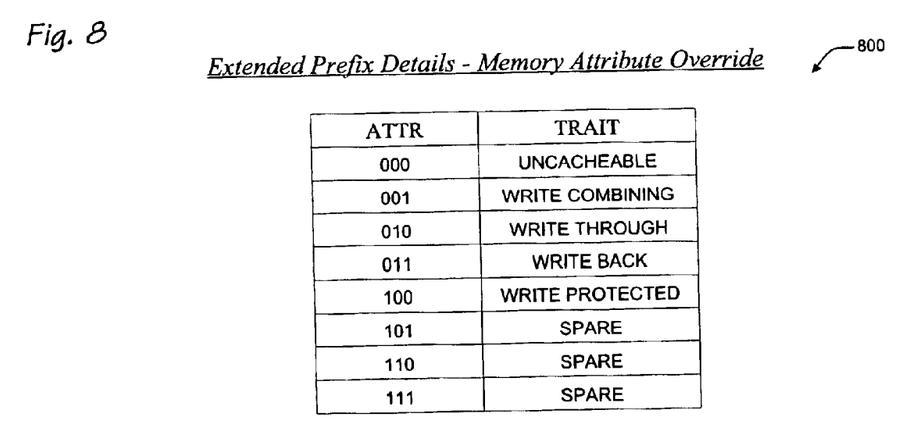
FIG. 8 is a table illustrating an exemplary encoding of typical memory traits for fields of the extended prefix of FIG. 7.

Turning to FIG. 8, a table 800 is presented illustrating an exemplary encoding of typical memory traits for fields of the extended prefix 700 of FIG. 7. The table 800 has an attribute column ATTR and a trait column TRAIT. The value of the attribute field 701 in column ATTR is mapped to a corresponding memory trait in column TRAIT. In the exemplary encoding, conventional memory traits are provided such as uncacheable (value 000) and write back (011), however, one skilled in the art will appreciate that other traits appropriate to a particular microprocessor architecture can be encoded via the attribute fields 601, 602, 701 of FIGS. 6 and 7.

Figure 9:
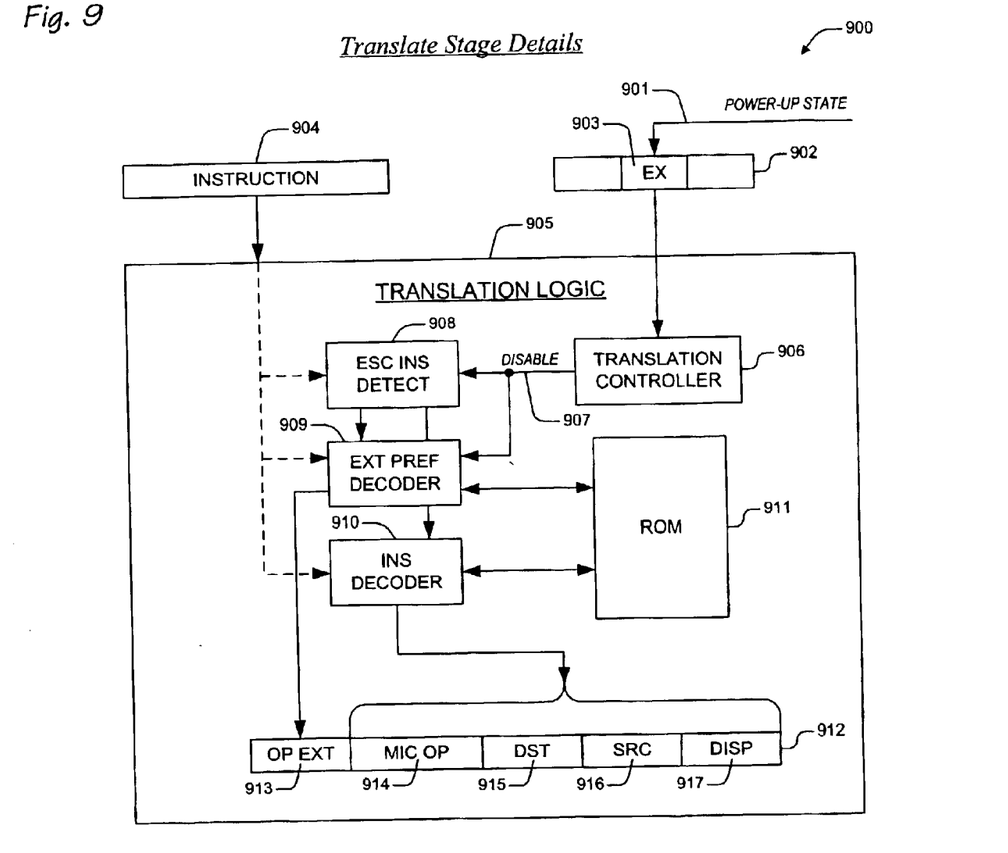
FIG. 9 is a block diagram featuring details of translate stage logic within the microprocessor of FIG. 5.

Referring to FIG. 9, a block diagram is presented featuring details of translate stage logic 900 within the microprocessor of FIG. 5. The translate stage logic 900 has an instruction buffer 904 that provides an extended instruction to translation logic 905. The translation logic 905 is coupled to a machine specific register 902 that has an extended features field 903. The translation logic 905 has a translation controller 906 that provides a disable signal 907 to an escape instruction detector 908 and an extended decoder 909. The escape instruction detector 908 is coupled to the extended decoder 909 and an instruction decoder 910. The extended decoding logic 909 and the instruction decoding logic 910 access a control read-only memory (ROM) 911, wherein are stored template micro instruction sequences that correspond to some of the extended instructions. The translation logic 905 also has a micro instruction buffer 912 having an opcode extension field 913, a micro opcode field 914, a destination field 915, a source field 916, and a displacement field 917.

Operationally, during power-up of the microprocessor, the state of the extended field 903 within the machine specific register 902 is established via signal power-up state 901 to indicate whether the particular microprocessor is capable of translating and executing extended instructions according to the present invention for overriding default memory attributes in the microprocessor. In one embodiment, the signal 901 is derived from a feature control register (not shown) that reads a fuse array (not shown) configured during fabrication of the part. The machine specific register 902 provides the state of the extended features field 903 to the translation controller 906. The translation control logic 906 controls whether or not instructions from the instruction buffer 904 are translated according to extended translation rules or according to conventional translation rules. Such a control feature is provided to allow supervisory applications (e.g., BIOS) to enable/disable extended execution features of the microprocessor. If extended features are disabled, then instructions having the opcode state selected as the extended features tag would be translated according to the conventional translation rules. In an x86 embodiment having opcode state F1H selected as the tag, an occurrence of F1H under conventional translation would result in an illegal instruction exception. With extended translation disabled, the instruction decoder 910 would translate/decode all provided instructions 904 and would configure all fields 913–917 of the micro instruction 912. Under extended translation rules, however, occurrence of the tag would be detected by the escape instruction detector 908. The escape instruction detector 908 would direct the extended prefix decoder 909 to translate/decode the extended prefix portion of the extended instruction according to extended translation rules and to configure the opcode extension field 913, this indicating the memory trait to be employed for a memory access prescribed by the remaining parts of the extended instruction. The instruction decoder 910 would decode/translate to remaining parts of the extended instruction and would configure the micro opcode field 914, source field 916, destination field 915, and displacement field 717 of the micro instruction 712. Certain instructions would cause access to the control ROM 911 to obtain corresponding micro instruction sequence templates. Configured micro instructions 912 are provided to a micro instruction queue (not shown) for subsequent execution by the processor.

Figure 10:
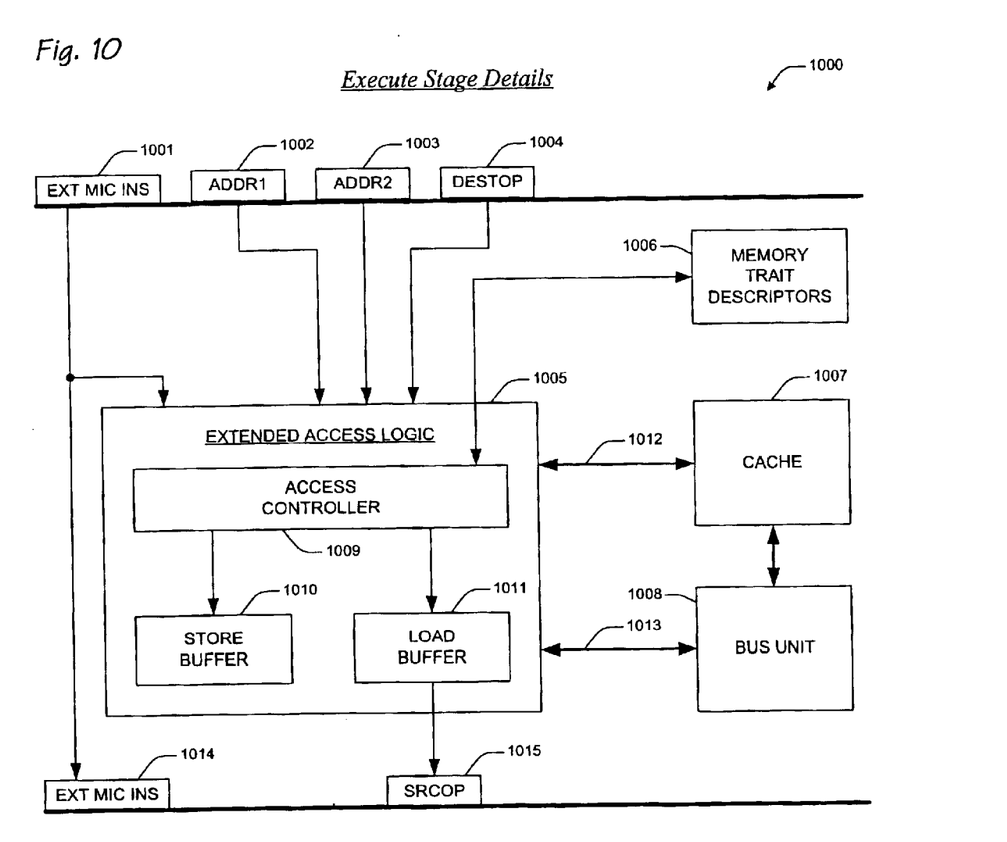
FIG. 10 is a block diagram illustrating extended execute stage logic within the microprocessor of FIG. 5.

Now referring to FIG. 10, a block diagram is presented illustrating extended execute stage logic 1000 within the microprocessor of FIG. 5. The extended execute stage logic 1000 has extended access logic 1005 that is coupled to a memory cache 1007 via bus 1012 and a bus unit 1008 via bus 1013. The bus unit 1008 is employed to conduct memory transactions over a memory bus (not shown). From a previous stage of a microprocessor according to the present invention, the extended access logic 1005 receives micro instructions from an extended micro instruction buffer 1001, two address operands from address buffers 1002–1003, and a destination operand from destination operand buffer 1004. The extended access logic 1005 is also coupled to a plurality of memory trait descriptors 1006 which are configured according to architectural conventions of the host microprocessor. The extended access logic 1005 includes an access controller 1009, a store buffer 1010, and a load buffer 1011. The load buffer 1011 provides a source operand output to a source operand buffer 1015.

In operation, the extended execution logic 1000 is employed to perform memory accesses to read operands from memory and to write operands to memory as directed by micro instructions provided in the extended micro instruction buffer 1001. For read/load operations, the access controller receives one or more memory addresses from address buffers 1002–1003 and accesses the memory trait descriptors 1006 to determine memory attributes associated with the load operations. In an x86 embodiment, the memory trait descriptors 1006 comprise x86 cache and paging control registers, page directory and page table entries, memory type range registers (MTTRs), page attribute table (PAT), and external signal pins KEN#, WB/WT#, PCD, and PWT. The access controller 1009 employs the information from these sources 1006 according to x86 hierarchical memory attribute conventions to determine the default memory attribute for the load operations. For embodiments other than x86, the access controller 1009 employs the information from memory trait descriptors 1006 according to hierarchical memory attribute conventions corresponding to the specific architecture of the host microprocessor to determine the default memory attribute for the load operations. The memory addresses, along with attributes for the corresponding accesses, are provided to the load buffer 1011. Based upon the specific attributes provided, the load buffer 1011 obtains the source operands from cache 1007 via bus 1012 or directly from system memory (not shown) via the bus unit 1008. The obtained source operands are provided to the source operand buffer 1015 in synchronization with a pipeline clock signal (not shown). The extended micro instruction is also piped to extended micro instruction register 1014 in synchronization with the clock signal. The source operands are thus provided to a following stage of the microprocessor.

For write/store operations directed by the extended micro instruction, the access controller 1009 receives address information for the operation from address buffers 1002–1003 along with the operand to be stored from buffer 1004. The access controller 1009 accesses the memory trait descriptors 1006 as described above with reference to load operations to determine the memory traits corresponding to the store access operation. The memory traits, address information, and the destination operand are provided to the store buffer 1010. Based upon the specific attributes provided, the store buffer 1010 writes the destination operand to cache 1007 via bus 1012 or directly to system memory via the bus unit 1008.

The store buffer 1010 and load buffer 1011 according to the present invention are configured to execute store and load access operations according to the processing requirements associated with the host processor's memory attribute model to include strong/weak ordering conventions (e.g., speculative execution rules) as well as cache access policies. In one embodiment, load and store operations are executed at different stages within a host microprocessor's pipeline.

For extended instructions that employ selective memory attribute override prefixes, the override memory traits for associated memory accesses (i.e., load, store, or both load and store) are provided to the access controller 1009 via the opcode extension field (not shown) of an extended micro instruction within the extended micro instruction buffer 1001. The access controller 1009, as described above, determines the default memory traits for the prescribed accesses via information obtained from the memory trait descriptors 1006. If the specified override traits are stronger than the corresponding default traits, then the access controller 1009 provides the override traits to the store buffer 1010/load buffer 1011 along with addresses and/or destination operand as described above. If the specified override traits are weaker than the corresponding default traits, then the access controller 1009 provides the default traits to the store buffer 1010/load buffer 1011 along with addresses and/or destination operand. Thus, selective memory overrides are only executed to strengthen a memory trait according to the specific architecture employed. For example, in an x86 architecture, an uncacheable trait for an access cannot be weakened to write back. Conversely, a write back trait can be strengthened to uncacheable. The trait to be employed for the accesses are applied at cache line granularity, which is 32 bytes many present day desktop/laptop microprocessor architectures.

Figure 11:
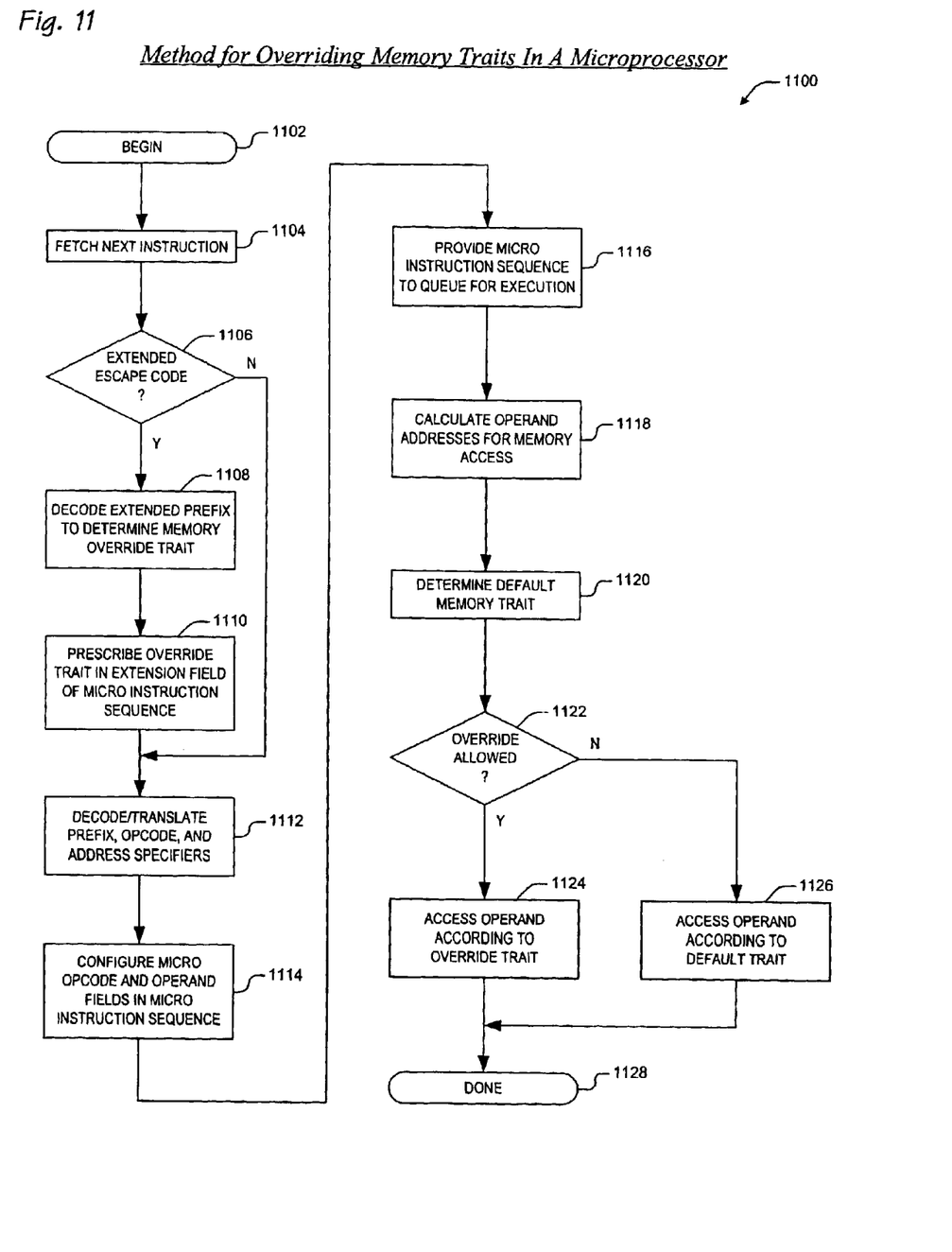
FIG. 11 is a flow chart depicting a method for overriding memory traits in a microprocessor according to the present invention.

Now referring to FIG. 11, a flow chart 1100 is presented depicting a method for translating and executing instructions that enables a programmer to override default memory attributes at the instruction level within in a microprocessor according to the present invention. Flow begins at block 1102 wherein a program configured with extended feature instructions is provided to the microprocessor. Flow then proceeds to block 1104.

At block 1104, a next instruction is fetched from cache/memory. Flow then proceeds to decision block 1106.

At decision block 1106, the instruction fetched in block 1104 is evaluated to determine if an extended escape code is provided according to the present invention. In an x86 embodiment, the evaluation is made to detect opcode value F1 (ICE BKPT). If the extended escape code is detected, then flow proceeds to block 1108. If the extended escape code is not present, then flow proceeds to block 1112.

At block 1108, an extended prefix part of the extended instruction is decoded/translated to determine a memory attribute that has been prescribed to override a default memory attribute for an associated memory access prescribed by the next instruction. Flow then proceeds to block 1110.

At block 1110, the memory attribute for the associated memory access is configured in an extension field of a corresponding micro instruction sequence. Flow then proceeds to block 1112.

At block 1112, all remaining parts of the instruction are decoded/translated to determine the prescribed memory access, register operand locations, memory address specifiers, along with the application of existing architectural features prescribed by prefixes according to the existing instruction set architecture. Flow then proceeds to block 1114.

At block 1114, a micro instruction sequence is configured to specify the prescribed memory reference along with its corresponding opcode extensions. Flow then proceeds to block 1116.

At block 1116, the micro instruction sequence is provided to a micro instruction queue for execution by the microprocessor. Flow then proceeds to block 1118.

At block 1118, the micro instruction sequence is retrieved by address logic according to the present invention. The address logic generates address for the memory access and provides the addresses to extended execution logic. Flow then proceeds to block 1120.

At block 1120, extended execution logic determines a default memory trait for the memory access using memory trait descriptive means according to the architecture of the microprocessor. Flow then proceeds to decision block 1122.

At decision block 1122, an evaluation is made to determine whether the prescribed memory attribute is allowed by cache/memory model conventions of the microprocessor architecture to override the default attribute. If override is allowed, then flow proceeds to block 1124. If override is not allowed, then flow proceeds to block 1126.

At block 1124, the memory access is performed by employing override memory attribute specified in the extended prefix field of block 1108. Flow then proceeds to block 1128.

At block 1126, the memory access is performed by employing the default memory attribute determined in block 1120. Flow then proceeds to block 1128.

At block 1128, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to specify memory attributes for memory accesses at the instruction level which are not otherwise provided for by existing instructions in a microprocessor instruction set.

In addition, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, providing for instruction level control of memory attributes within a microprocessor, the apparatus comprising:
   translation logic, for translating an extended instruction into a micro instruction sequence, wherein said extended instruction comprises:
      an extended prefix, for specifying a memory trait for a memory reference prescribed by said extended instruction, wherein said memory trait for said memory reference cannot be specified by an existing instruction from an existing instruction set; and
      an extended prefix tag, for indicating said extended prefix, wherein said extended prefix tag is an otherwise architecturally specified opcode within said existing instruction set; and
   extended execution logic, coupled to said translation logic, for receiving said micro instruction sequence, and for employing said memory trait to execute said memory reference.

2. The apparatus as recited in claim 1, wherein said extended instruction further comprises instruction entities according to said existing instruction set.

3. The apparatus as recited in claim 2, wherein said instruction entities prescribe an operation to be executed by the microprocessor, and wherein said operation comprises said memory reference.

4. The apparatus as recited in claim 1, wherein said memory reference comprises an operand load, an operand store, or both.

5. The apparatus as recited in claim 1, wherein said memory trait prescribes how a memory cache is to be employed during execution of said memory reference.

6. The apparatus as recited in claim 1, wherein said memory trait prescribes how said memory reference is to be ordered for execution relative to other memory references.

7. The apparatus as recited in claim 1, wherein said extended prefix directs the microprocessor to override a default memory trait when executing said memory reference.

8. The apparatus as recited in claim 1, wherein said extended prefix comprises 8 bits.

9. The apparatus as recited in claim 1, wherein said extended prefix comprises:
an attribute field, for specifying said memory trait, wherein said memory trait comprises one of a plurality of memory attributes.

10. The apparatus as recited in claim 9, wherein said plurality of memory attributes comprises uncacheable, write combining, write through, write back, and write protected.

11. The apparatus as recited in claim 1, wherein said existing instruction set comprises the x86 instruction set.

12. The apparatus as recited in claim 1, wherein said extended prefix tag comprises opcode F1 (ICE BKPT) in the x86 instruction set.

13. The apparatus as recited in claim 1, wherein said translation logic comprises:
escape instruction detection logic, for detecting said extended prefix tag;
instruction decoding logic, for determining an operation to be performed, wherein said operation comprises said memory reference; and
extended decoding logic, coupled to said escape instruction detection logic and said instruction decoding logic, for determining said memory trait, and for prescribing said memory trait within said micro instruction sequence.

14. A microprocessor mechanism, for extending an existing instruction set to provide for selective control of memory traits, the microprocessor mechanism comprising:
an extended instruction, configured to prescribe a memory attribute for a memory access, wherein said extended instruction comprises a selected opcode in the existing instruction set followed by an n-bit extended prefix, said selected opcode indicating said extended instruction and said n-bit extended prefix indicating said memory attribute, wherein said memory attribute for said memory access cannot otherwise be prescribed by instructions according to the existing instruction set; and
a translator, configured to receive said extended instruction, and configured to generate a micro instruction sequence directing a microprocessor to execute said memory access, wherein said memory access is to be executed according to said memory attribute.

15. The microprocessor mechanism as recited in claim 14, wherein said extended instruction further comprises:
remaining instruction entities, configured to specify said memory access, wherein said memory attribute is employed over a default memory attribute during execution of said memory access.

16. The microprocessor mechanism as recited in claim 14, wherein said n-bit prefix comprises:
an memory trait field, configured to specify said memory attribute for execution of said memory access, wherein said memory attribute comprises one of a plurality of memory access traits.

17. The microprocessor mechanism as recited in claim 16, wherein said plurality of memory access traits comprises uncacheable, write combining, write back, write through, and write protected.

18. The microprocessor mechanism as recited in claim 14, wherein said n-bit extended prefix comprises 8 bits.

19. The microprocessor mechanism as recited in claim 14, wherein the existing instruction set is the x86 microprocessor instruction set.

20. The microprocessor mechanism as recited in claim 14, wherein said selected opcode comprises opcode ICE BKPT (i.e., opcode F1) in the x86 microprocessor instruction set.

21. The microprocessor mechanism as recited in claim 14, wherein said translator comprises:
an escape instruction detector, for detecting said selected opcode within said extended instruction;
an instruction decoder, for decoding remaining parts of said extended instruction to determine said memory access; and
an extended prefix decoder, coupled to said escape instruction detector and said instruction decoder, for decoding said n-bit extended prefix, and for specifying said memory attribute within said micro instruction sequence.

22. An apparatus, for adding instruction level memory trait control features to an existing instruction set, the apparatus comprising:
an escape tag, for reception by translation logic, and for indicating that accompanying parts of a corresponding instruction prescribe a memory access, wherein said escape tag is a first opcode within the existing instruction set;
a memory trait specifier, coupled to said escape tag and being one of said accompanying parts, for prescribing one of a plurality of memory traits for said memory access; and
extended execution logic, coupled to said translation logic, for executing said memory access using said one of said plurality of memory traits, wherein the existing instruction set provides only for specification of a default memory trait for said memory access, and wherein said execution logic employs said one of a plurality of memory traits to override said default memory trait.

23. The apparatus as recited in claim 22, wherein remaining ones of said accompanying parts comprise a second opcode, for specifying said memory access.

24. The apparatus as recited in claim 22, wherein said extended memory trait specifier comprises 8 bits.

25. The apparatus as recited in claim 22, wherein the existing instruction set is the x86 instruction set.

26. The apparatus as recited in claim 22, wherein said first opcode comprises the ICE BKPT opcode (i.e., opcode F1) in the x86 instruction set.

27. The apparatus as recited in claim 22, wherein said translation logic translates said escape tag and said accompanying parts into corresponding micro instructions that direct said extended execution logic to perform said memory access according to said one of said plurality of memory traits.

28. The apparatus as recited in claim 22, wherein said plurality of memory traits comprises uncacheable, write combining, write through, write back, and write protected.

29. The apparatus as recited in claim 22, wherein said translation logic comprises:
escape tag detection logic, for detecting said escape tag, and for directing that said accompanying parts be translated according to extended translation conventions; and decoding logic, coupled to said escape tag detection logic, for performing translation of instructions according to conventions of the existing instruction set, and for performing translation of said corresponding instruction according to said extended translation conventions to enable execution of said memory access according to said one of said plurality of memory traits.

30. A method for extending an existing instruction set architecture to provide for selective memory attribute control at the instruction level, the method comprising:

provICTing an extended instruction, the extended instruction including an extended tag along with an extended prefix, wherein the extended tag is a first opcode entity according to the existing instruction set architecture;

prescribing, via the extended prefix, a memory attribute to be employed for a corresponding memory access, wherein the memory access is specified by remaining parts of the extended instruction; and employing the memory attribute to execute the memory access, wherein said employing supersedes a default memory attribute for the memory access.

31. The method as recited in claim 30, wherein said prescribing comprises:

first specifying the memory access within the remaining parts of the extended instruction, wherein said first specifying comprises employing a second opcode entity according to the existing instruction set architecture.

32. The method as recited in claim 30, wherein said providing comprises employing an 8-bit entity to configure the extended prefix.

33. The method as recited in claim 30, wherein said providing comprises selecting the first opcode entity according to the x86 microprocessor instruction set architecture.

34. The method as recited in claim 30, wherein said providing comprises choosing the x86 ICE BKPT opcode (i.e., opcode F1) as the extended tag.

35. The method as recited in claim 30, further comprising:

translating the extended instruction into a micro instruction sequence that directs extended execution logic to execute the memory access according to the memory attribute.

36. The method as recited in claim 35, wherein said translating comprises:

within translation logic, detecting the extended tag; and decoding the extended prefix and the remaining parts according to extended translation rules to generate the micro instruction sequence.

37. The method as recited in claim 30, wherein said prescribing comprises:

specifying one of the following memory traits as the memory attribute to be employed to override the default memory attribute: uncacheable, write combining, write through, write back, and write protected.

* * * * *